United States Patent
So (10) Patent No.: US 9,966,806 B2
(45) Date of Patent: May 8, 2018

(54) ELECTRICITY GENERATION DEVICE USING NEODYMIUM MAGNET HAVING HELICAL STRUCTURE

(71) Applicant: Mun Seop So, Gyeonggi-do (KR)

(72) Inventor: Mun Seop So, Gyeonggi-do (KR)

( * ) Notice: Subject to any disclaimer, the term of this patent is extended or adjusted under 35 U.S.C. 154(b) by 270 days.

(21) Appl. No.: 15/033,114

(22) PCT Filed: Sep. 18, 2014

(86) PCT No.: PCT/KR2014/008686
§ 371 (c)(1),
(2) Date: Apr. 29, 2016

(87) PCT Pub. No.: WO2015/064911
PCT Pub. Date: May 7, 2015

(65) Prior Publication Data
US 2016/0254708 A1 Sep. 1, 2016

(30) Foreign Application Priority Data

Oct. 29, 2013 (KR) .......................... 10-2013-0129073

(51) Int. Cl.
*H02K 1/17* (2006.01)
*H02K 1/02* (2006.01)
(Continued)

(52) U.S. Cl.
CPC ................ *H02K 1/17* (2013.01); *H02K 1/02* (2013.01); *H02K 1/2786* (2013.01); *H02K 3/04* (2013.01);
(Continued)

(58) Field of Classification Search
CPC .......... H02K 1/17; H02K 1/02; H02K 1/2786; H02K 16/04; H02K 7/1861; H02K 21/22; H02K 1/278; H02K 2201/06; H02K 3/04
(Continued)

(56) References Cited

U.S. PATENT DOCUMENTS 3,426,224 A * 2/1969 Esters ................... H02K 23/04
310/154.43
6,304,017 B1 * 10/2001 Leupold ............... H02K 1/2786
310/114
(Continued)

FOREIGN PATENT DOCUMENTS

JP 07-163132 A 6/1995
JP 2010-004716 A 1/2010
(Continued)

OTHER PUBLICATIONS

Seop (KR 101223825 B1) English Translation.*
International Search Report for PCT/KR2014/008686 dated Jan. 5, 2015 from Korean Intellectual Property Office.

*Primary Examiner* — Michael Andrews
*Assistant Examiner* — Robert E Mates
(74) *Attorney, Agent, or Firm* — Revolution IP, PLLC (57) ABSTRACT

The present invention provides an electricity generation device using a neodymium magnet having a helical structure that generates more electricity from the same torque during the same amount of time than common electricity generation devices using magnets, by helically arranging neodymium magnets, which has magnetic force significantly larger than common magnets, outside a unit coil, and that has improved performance of generating electricity by transmitting magnetic fields in vortexes to the unit coil. The electricity generation device using a neodymium magnet having a helical structure includes a first neodymium magnet, a second neodymium magnet, a third neodymium magnet, a first side magnet, a second magnet, a rod, and a unit coil. The electricity generation device using a neodymium magnet having a helical structure further includes a case, a first cover, a second cover, a cradle, a side gear, a first gear, and a handle.

7 Claims, 7 Drawing Sheets

(51) Int. Cl.
  *H02K 1/27* (2006.01)
  *H02K 3/04* (2006.01)
  *H02K 21/22* (2006.01)
  *H02K 7/18* (2006.01)

(52) U.S. Cl.
  CPC .......... *H02K 7/1861* (2013.01); *H02K 21/22* (2013.01); *H02K 1/278* (2013.01); *H02K 2201/06* (2013.01)

(58) Field of Classification Search
  USPC ................ 310/266, 154.02, 181, 156.47
  See application file for complete search history.

(56) References Cited

U.S. PATENT DOCUMENTS

| | | | | |
|---|---|---|---|---|
| 8,159,104 | B1* | 4/2012 | Bojiuc | H02K 16/04 310/154.02 |
| 2006/0038454 | A1* | 2/2006 | Bojiuc | H02K 7/20 310/112 |

FOREIGN PATENT DOCUMENTS

| KR | 10-2009-0038532 A | 4/2009 |
|---|---|---|
| KR | 10-2011-0010852 A | 2/2011 |
| KR | 10-1223825 B1 | 1/2013 |
| KR | 101223825 B1 * | 1/2013 |

\* cited by examiner

ELECTRICITY GENERATION DEVICE USING NEODYMIUM MAGNET HAVING HELICAL STRUCTURE

CROSS REFERENCE TO PRIOR APPLICATIONS

This application is a National Stage Application of PCT International Patent Application No. PCT/KR2014/008686 filed on Sep. 18, 2014, under 35 U.S.C. § 371, which claims priority to Korean Patent Application No. 10-2013-0129073 filed on Oct. 29, 2013, which are all hereby incorporated by reference in their entirety.

TECHNICAL FIELD

The present invention relates to an electricity generation device using a neodymium magnet and, more particularly, to an electricity generation device using a neodymium magnet having a helical structure, the electricity generation device being able to increase efficiency of generating the same amount of electricity in the same amount of time from the same torque, as common electricity generation devices using magnets, by using neodymium magnets, which are over ten times higher in magnetic intensity than common magnets and are helically arranged to rotate in a winding coil body, and that can remarkably improve electricity generation ability by transmitting a magnetic field in a vortex to the winding coil body.

BACKGROUND ART

In general, electricity, which is an important necessity in modern life, is required for operating devices such as lights, office equipment such as computers, and various other electric devices such as elevators, etc.

Electricity, as described above, may be generated by hydroelectric power generation using water power, thermal power generation using thermal power, and nuclear power generation using atomic power.

However, as for hydroelectric power generation, since there are large differences in the amount of water, depending on seasons that have a large amount of rainfall such as summer and seasons that have a relatively small amount of rainfall such as spring, fall, or winter, it is difficult to continuously generate electricity, so efficiency of generating electricity is low.

As for thermal power generation, since it is required to continuously burn fossil fuel such as oil or coal, the environment and the atmosphere are contaminated by noxious gases produced in the combustion process.

In particular, the problems with thermal power generation cause global warming due to air pollution, which is considered a major environmental issue.

As for nuclear power generation, the cost for generating electricity compared to the amount of electricity produced is low and environmental contamination can be reduced by decreasing exhaust of carbon dioxide, but civil petitions over concern about contamination due to leakage of radioactivity are ongoing.

In order to solve these problems, environment-friendly power generation facilities have been studied as an alternative measure, and as a representative example, there is solar power generation using solar heat or wind power generation using wind power.

However, according to solar power generation, productivity is low because it is difficult to generate electricity at night or during cloudy days, and the solar collectors of a solar power generation system are expensive, so common homes cannot use them. In particular, in a large city with many apartments there is no space for installing solar collectors for the apartments, so solar power generation systems are rarely installed in large cities in spite of the excellent performance.

Further, as for wind power generation, continuous wind is necessary, so wind power generation systems are usually constructed at the summits of mountains or seaside areas. However, such wind power generation systems are difficult to replace and repair because of their locations at the summits of mountains or seaside areas, so management is not easy. Further, if wind does not continuously blow, there is another problem that it is difficult to stably generate electric energy.

Accordingly, various electricity generation devices using magnets have been proposed and a device that generates electricity by rotating unit coils along a gap between N-pole permanent magnets and S-pole permanent magnets in Korean Patent Application Publication No. 10-2009-0038532 has been proposed. According to this device, a plurality of N-pole permanent magnets and S-pole permanents magnets are symmetrically arranged with a predetermined gap therebetween in a circular magnet assembly stator, and support the center of a rotary member through a bearing on the central shaft vertically disposed in the center of the circular magnet assembly stator; unit coils are positioned in the gap between the N-pole permanent magnet and the S-pole permanent magnets and fixed by the rotary member in the circular magnet assembly stator, and a driving unit is engaged with the end or a central rotary shaft of the rotary member. Accordingly, when the rotary member is rotated by the driving unit, electricity is generated in the unit coils in the gap between the N-pole permanent magnet and the S-pole permanent magnets of the circular magnet assembly stator. Further, wires coming out of the unit coils are connected to the central shaft along the rotary member and the unit coils transmitting electricity to a brush and a rectifier are rotated along the gap between the N-pole permanent magnet and the S-pole permanent magnets, thereby generating electricity.

However, the permanent magnets used in this device have weak magnetic intensity, so the intensity of generated electricity is not high and accordingly efficiency of generating electricity is very low.

Further, since the N-pole permanent magnet and the S-pole permanent magnets are circularly arranged to face each other, electricity productivity is reduced due to low intensity of a magnetic field generated by the permanent magnets and it is required to rotate the unit coils at a high speed in order to increase the electricity productivity.

Further, electricity generation devices using permanent magnets and unit coils in the related art have a configuration in which the permanent magnets are arranged horizontally with respect to the unit coils, so the intensity of electricity generated by the permanent magnets is not large and the performance of generating electricity is very low.

In order to solve these problems, an electricity generation device using neodymium magnets having a helical structure has been proposed in Korean Patent No. 10-1223825. The device includes: a circular rotor having a rotary shaft protruding at the center and having first magnet holders and second magnet holders; a coil 20 disposed around the edge of the rotor; first neodymium magnets fitted in the first magnet holders of the rotor, helically arranged, and having a first pole and a second pole; second neodymium magnets fitted in the second magnet holders of the rotor, helically arranged, and having a third pole and a fourth pole; and a first magnetic field section, a second magnetic field section, and a third magnetic field section defined between the rotary shaft, the first neodymium magnets, and the second neodymium magnets, respectively.

This electricity generation device provides an advantage of being able to increasing efficiency of electricity, but the present invention has been made on the basis of a technological concept that can further increase performance of generating electricity by more effectively generating electricity. Further, according to this electricity generation device, impact resistance or durability except the components for generating electricity are not considered, so a measure is needed against this problem.

DISCLOSURE

Technical Problem

An object of the present invention is to provide an electricity generation device using a neodymium magnet having a helical structure, the device being able to solve the problems of devices for generating electricity using magnets in the related art, to generate electricity with higher efficiency than conventional electricity generation devices using neodymium magnets, and to have improved impact resistance and durability.

Technical Solution

An electricity generation device using a neodymium magnet having a helical structure of the present invention includes: a first neodymium magnet formed in the shape of a cylindrical body, which is open at both ends and has a first mounting hole, and composed of partial neodymium magnets arranged around an outer side of the body helically with respect to a longitudinal direction, in which an inside of the cylindrical body makes a first pole and the outer side makes a second pole; a second neodymium magnet formed in the shape of a cylindrical body, which is open at both ends and has a second mounting hole, and composed of partial neodymium magnets arranged around an outer side of the body helically with respect to a longitudinal direction, in which an inside of the cylindrical body makes a second pole and the outer side makes a first pole, and the first neodymium magnet is disposed inside the cylindrical body; a third neodymium magnet formed in the shape of a cylindrical body, which is open at both ends and has a third mounting hole, and composed of partial neodymium magnets arranged around an outer side of the body helically with respect to a longitudinal direction, in which an inside of the cylindrical body makes a first pole and the outer side makes a second pole, and the second neodymium magnet is disposed inside the cylindrical body; a first side magnet disposed on a first side of the third neodymium magnet, having a first groove in which a first end of the second neodymium magnet is fitted, and having a first support hole having a diameter smaller than the first groove at a center; a second side magnet disposed on a second side of the third neodymium magnet, having a second groove in which a second end of the second neodymium magnet is fitted, and having a second support hole having a diameter smaller than the second groove at a center; a rod inserted in the first mounting hole of the first neodymium magnet, with a first end passing through the first support hole and a second end passing through the second support hole; and a unit coil wound on the rod, in which the first neodymium magnet and the third neodymium magnet are fixed and the second neodymium magnet rotates between the first neodymium magnet and the third neodymium magnet to generate an electric field around the unit coil so that electricity is generated in the unit coil.

The first end inserted in the first groove of the second neodymium magnet may make a first pole, the first hole of the first side magnet may make a first pole, the second end inserted in the second groove of the second neodymium magnet may make a second pole, and the second groove of the second side magnet may make a second pole.

The electricity generation device using a neodymium magnet having a helical structure may include: a case having a space for accommodating the rod, the unit coil, the first neodymium magnet, the second neodymium magnet, the third neodymium magnet, the first side magnet, and the second side magnet, and being formed in the shape of a cylindrical body with both ends open; a first cover coupled to a first end of the case to cover the first end and having a first through-hole through which the first end of the rod and a first end of the unit coil pass; a second cover coupled to a second end of the case to cover the second end and having a second through-hole through which the second end of the rod and a second end of the unit coil.

The electricity generation device using a neodymium magnet having a helical structure may further include a cradle having a first holder where the first end of the rod is coupled, a second holder where the second end of the rod is coupled, and a base disposed between the first holder and the second holder and having seats where the case is seated.

A side gear having teeth may be formed on a side of the second neodymium magnet, the electricity generation device using a neodymium magnet having a helical structure may further include a first gear being in mesh with the side gear to operate together and a handle coupled to the first gear at a side of the central axis of the first gear, and in this case, the case may further has a seat protruding in a direction to seat the first gear.

The first pole and the second pole of each of the first neodymium magnet, the second neodymium magnet, and the third neodymium magnet may be any one of an N-pole and an S-pole.

The first neodymium magnet, the second neodymium magnet, and the third neodymium magnet may be combined without outer sides and inner sides in contact with each other.

The first neodymium magnet and the third neodymium magnet arranged helically at an angle may be inclined in the same direction.

The first neodymium magnet and the third neodymium magnet arranged helically at an angle may be inclined in opposite direction to the second neodymium magnet.

Advantageous Effects

The present invention can provide an electricity generation device that can generate electricity with higher efficiency than electricity generation devices in the related art that generate electricity using neodymium magnet, and has improved impact resistance and durability, in addition to solving the problems of the electricity generation devices that generate electricity using magnets in the related art.

BEST MODE

Hereinafter, other objects and characteristics of the present invention except the objects described above will be made clear through the following description about embodiments referring to the accompanying drawings.

Unless otherwise defined, all terms including technical and scientific terms used herein have the same meaning as commonly understood by one of ordinary skill in the art to which the present invention belongs. It must be understood that the terms defined by the dictionary are identical with the meanings within the context of the related art, and they should not be ideally or excessively formally defined unless the context clearly dictates otherwise.

Hereafter, electricity generation devices using a neodymium magnet having a helical structure according to embodiments of the present invention will be described in detail with reference to FIGS. 1 to 6.

Figure 1:
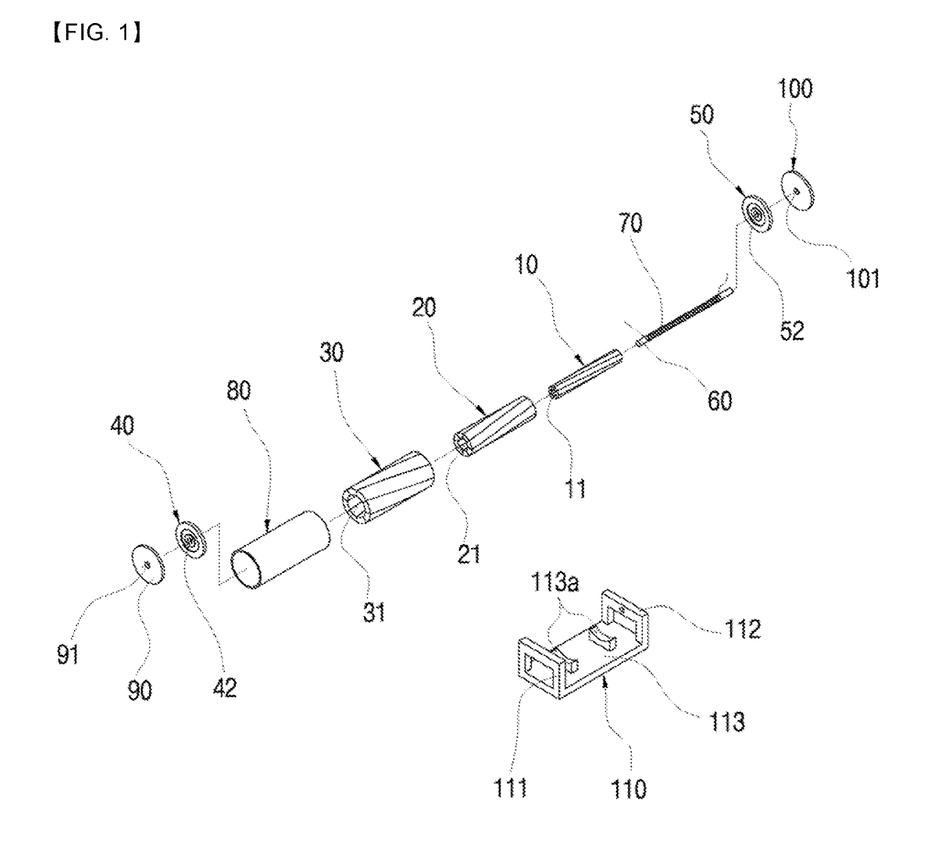
FIG. 1 is an exploded perspective view of an electricity generation device using a neodymium magnet having a helical structure according to an embodiment of the present invention.
Figure 2:
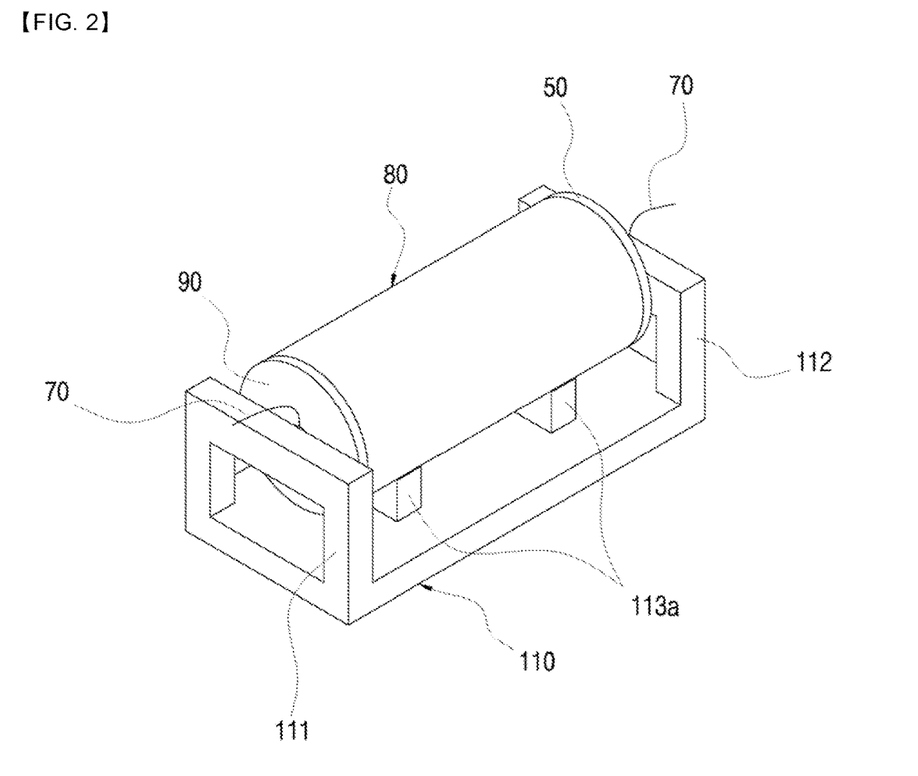
FIG. 2 is a perspective assembly view of the electricity generation device using a neodymium magnet having a helical structure shown in FIG. 1.
Figure 3:
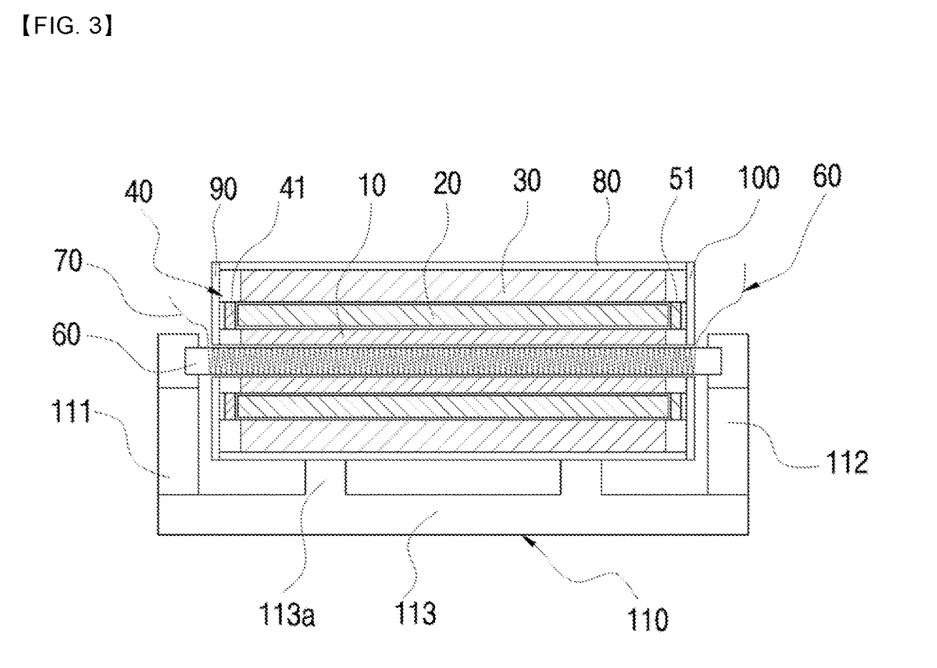
FIG. 3 is a vertical cross-sectional view of the electricity generation device using a neodymium magnet having a helical structure shown in FIG. 2.
Figure 4:
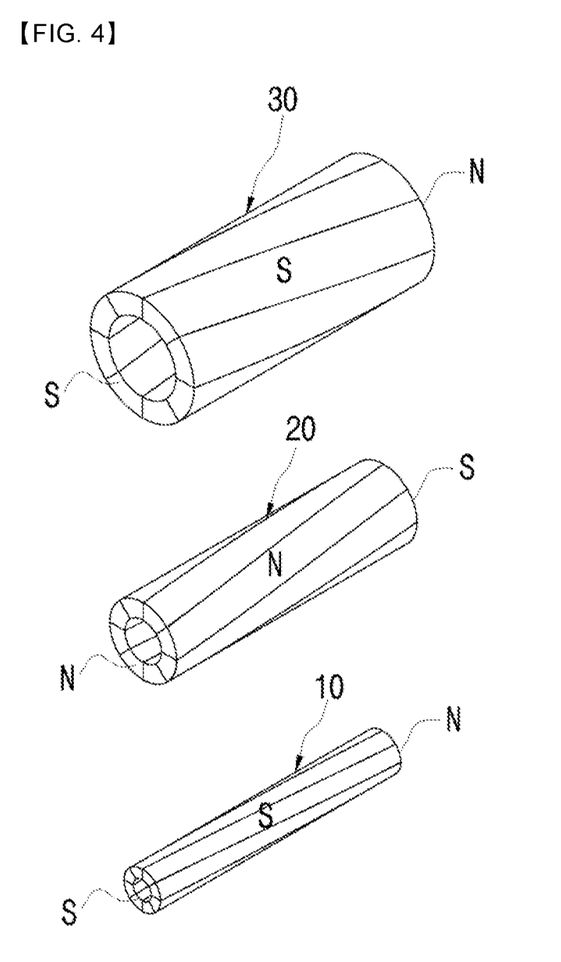
FIG. 4 is a perspective view showing polarities of a first neodymium magnet, a second neodymium magnet, and a third neodymium magnet shown in FIG. 1.
Figure 5:
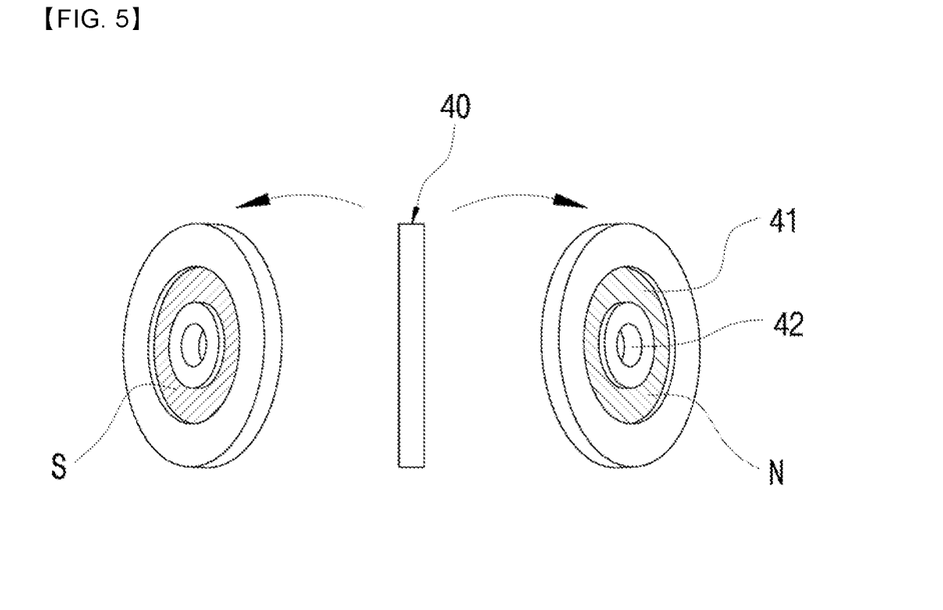
FIG. 5 is a perspective view showing the polarities of a first side magnet shown in FIG. 1.
Figure 6:
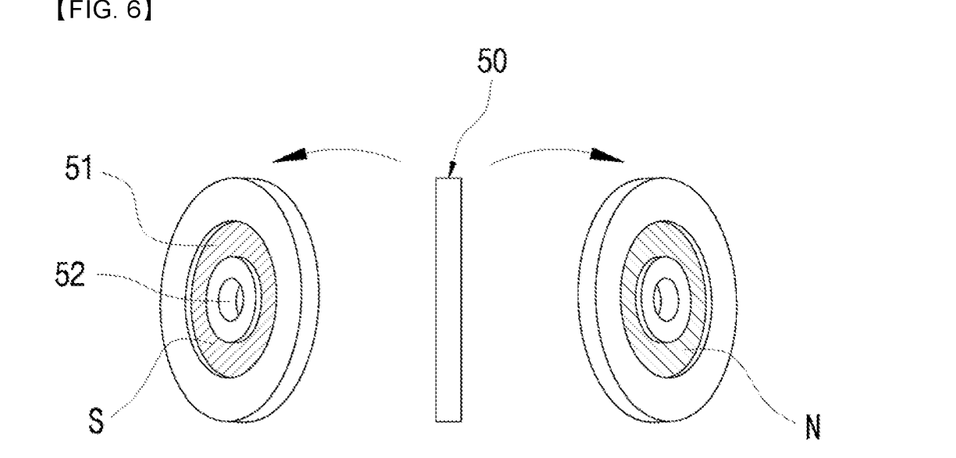
FIG. 6 is a perspective view showing the polarities of a second side magnet shown in FIG. 1.

FIG. 1 is an exploded perspective view of an electricity generation device using a neodymium magnet having a helical structure according to an embodiment of the present invention. FIG. 2 is a perspective assembly view of the electricity generation device using a neodymium magnet having a helical structure shown in FIG. 1. FIG. 3 is a vertical cross-sectional view of the electricity generation device using a neodymium magnet having a helical structure shown in FIG. 2. FIG. 4 is a perspective view showing polarities of a first neodymium magnet, a second neodymium magnet, and a third neodymium magnet shown in FIG. 1. FIG. 5 is a perspective view showing the polarities of a first side magnet shown in FIG. 1. FIG. 6 is a perspective view showing the polarities of a second side magnet shown in FIG. 1.

As shown in FIGS. 1 to 6, an electricity generation device using a neodymium magnet having a helical structure according to an embodiment of the present invention includes a first neodymium magnet 10, a second neodymium magnet 20, a third neodymium magnet 30, a first side magnet 40, a second side magnet 50, a rod 60, and a unit coil 70.

The first neodymium magnet 10 is formed in the shape of a cylindrical body being open at both ends and having a first mounting hole 11 and is composed of partial neodymium magnets arranged around the outer side of the body helically with respect to the longitudinal direction, in which the inside of the cylindrical body makes a first pole and the outer side makes a second pole. The first pole and the second pole used herein are terms indicating the positive pole and the negative pole of a magnet, so the magnet has two poles having opposite polarities. That is, when the first pole is the positive pole, the second pole is the negative pole, and when the second pole is the positive pole, the first pole is the negative pole.

The second neodymium magnet 20 is formed in the shape of a cylindrical body being open at both ends and having a second mounting hole 21 and is composed of partial neodymium magnets arranged around the outer side of the body helically with respect to the longitudinal direction, in which the inside of the cylindrical body makes a second pole and the outer side makes a first pole. The first neodymium magnet 10 is disposed inside the cylindrical body. In this case, the second neodymium magnet 20 can rotate. The second neodymium magnet 20 rotates outside the first neodymium magnet 10 and, the inner side of the first neodymium magnet 10 and the outer side of the second neodymium magnet 20 have the same polarity.

The third neodymium magnet 30 is formed in the shape of a cylindrical body being open at both ends and having a third mounting hole 31 and is composed of partial neodymium magnets arranged around the outer side of the body helically with respect to the longitudinal direction, in which the inside of the cylindrical body makes a first pole and the outer side makes a second pole. The second neodymium magnet 20 is disposed inside the cylindrical body. That is, the third neodymium magnet 30 is disposed outside the second neodymium magnet 20.

The first side magnet 40 is disposed on a first side of the third neodymium magnet 30 and has a first groove 41 in which a first end of the second neodymium magnet 20 can be fitted. According to this configuration, the first side magnet 40 may be coupled to the first side of the third neodymium magnet 30. Further, the first side magnet 40 has a first support hole 42 having a diameter smaller than the first groove 41 at the center.

When the first end of the second neodymium magnet 20 is fitted, the first groove 41 retains the first end of the second neodymium magnet 20 such that the second neodymium magnet 20 does not come in contact with the outer side of the first neodymium magnet 10 and the inner side of the third neodymium magnet 30.

The second side magnet 50 is disposed on a second side of the third neodymium magnet 30 and has a second groove 41 in which a second end of the second neodymium magnet 20 can be fitted. According to this configuration, the second side magnet 50 may be coupled to the second side of the third neodymium magnet 30. Further, the second side magnet 50 has a second support hole 52 having a diameter smaller than the second groove 51 at the center.

When the second end of the second neodymium magnet 20 is fitted, the second groove 51 retains the second end of the second neodymium magnet 20 such that the second neodymium magnet 20 does not come in contact with the outer side of the first neodymium magnet 10 and the inner side of the third neodymium magnet 30.

The rod 60 is inserted in the first mounting hole 11 of the first neodymium magnet 10, with a first end exposed out of the first mounting hole 11 and passing through the first support hole 42 of the first side magnet 40 and a second end exposed out of the first mounting hole 11 and passing through the second support hole 52 of the second side magnet 50. The rod 60 supports the first neodymium magnet 10, with both ends passing through the first side magnet 40 and the second side magnet 50, so it retains the first side magnet 40 and the second side magnet 50 to prevent the side magnets from moving up and down, thereby preventing components combined with or inserted in the first side magnet 40 and the second side magnet 50 from being moved.

The unit coil 70 is wound around the rod 60. That is, the unit coil 70 is wound on the rod 60, with a first end exposed to the outside through the first support hole 42 of the first side magnet 40 and a second end exposed to the outside through the second support hole 52 of the second side magnet 50.

In the electricity generation device using a neodymium magnet having a helical structure according to an embodiment of the present invention having the configuration described above, with the first neodymium magnet 10 and the third neodymium magnet 30 fixed, the second neodymium magnet 20 generates an electric field around the unit coil 70 by rotating between the first neodymium magnet 10 and the third neodymium magnet 30, whereby the unit coil 70 generates electricity. This configuration is achieved by neodymium magnets having the largest energy among common magnets and a neodymium magnet is easy to manufacture, is inexpensive in terms of the magnetic force, and has high oxidizing power, so neodymium magnets are extensively used, for example, for vehicles, sensors, speakers, servo motors, handbags, accessories, healthcare products, and various switches. Further, it is possible to generate a large amount of electricity, as compared with electricity generation devices using common permanent magnets.

In this configuration, since the second neodymium magnet 20 rotates between the first neodymium magnet 10 and the third neodymium magnet 30, which have a helical structure, with the outer side having the same polarity as that of the inner side of the third neodymium magnet 30 and the inner side having the same polarity as that of the outer side of the first neodymium magnet 10, a magnetic field vortex generated between the third neodymium magnet 30 and the second neodymium magnet 20, and a second magnetic field vortex generated between the first neodymium magnet 10 and the second neodymium magnet 20 are transmitted to the unit coil 70, so the intensity of the magnetic fields is increased. Accordingly, it is possible to generate more electricity than the related art from the same torque during the same amount of time.

Further, in the electricity generation device using a neodymium magnet having a helical structure according to an embodiment of the present invention, the first end of the second neodymium magnet 20 fitted in the first groove 41 makes a first pole, the first groove 41 of the first side magnet 40 makes a first pole, the second end of the second neodymium magnet 20 fitted in the second groove 51 makes a second pole, and the second groove 51 of the second side magnet 50 makes a second pole. That is, the second neodymium magnet 20 and the first groove 41 commonly make a first pole therebetween, while the neodymium magnet 20 and the second groove 51 commonly make a second pole therebetween, so a third magnetic field vortex is generated between the second neodymium magnet 20 and the first groove 41 and transmitted to the unit coil 70, and a fourth magnetic field vortex is generated between the second neodymium magnet 20 and the second groove 51 and is transmitted to the unit coil 70. Accordingly, the intensity of the magnetic fields is increased and it is possible to generate more electricity than the related art from the same amount of torque during the same amount of time.

The electricity generation device using a neodymium magnet having a helical structure according to an embodiment of the present invention may further include a case 80, a first cover 90, and a second cover 100.

The case 80 has a space for accommodating the rod 60, unit coil 70, first neodymium magnet 10, second neodymium magnet 20, third neodymium magnet 30, first side magnet 40, and second side magnet 50 and is formed in the shape of a cylindrical body with both ends open.

The first cover 90 is coupled to a first end of the case to cover the first end and has a first through-hole 91 through which the first end of the rod 60 and a first end of the unit coil 70 pass.

The second cover 100 is coupled to a second end of the case 80 to cover the second end and has a second through-hole 101 through which the second end of the rod 60 and a second end of the unit coil 70 pass.

The case 80, the first cover 90, and the second cover 100 are combined with each other and protect the first neodymium magnet 10, second neodymium magnet 20, third neodymium magnet 30, and first side magnet 40, and second side magnet 50 from external shock, thereby improving durability. In particular, the first cover 90 and the second cover 100 prevents lateral movement of the first side magnet 40 and the second side magnet 50, thereby retaining the first neodymium magnet 10, second neodymium magnet 20, third neodymium magnet 30, and rod 60 fitted to the first side magnet 40 and the second side magnet 50. Accordingly, the relatively arranged positions of the first neodymium magnet 10, second neodymium magnet 20, and third neodymium magnet 30, and rod 60 are prevented from changing.

Further, the electricity generation device using a neodymium magnet having a helical structure according to an embodiment of the present invention may further include a cradle 110.

The cradle 110 has a first holder 111, a second holder 112, and a base 113.

The first holder 111 is formed in the shape of a frame and the first end of the rod 60 is coupled to the first holder 111. The first holder 111 may have a hole for coupling the first end of the rod 60.

The second holder 112 is formed in the shape of a frame and the second end of the rod 60 is coupled to the first holder 111. The second holder 112 may have a hole for coupling the second end of the rod 60.

The base 113 is disposed between the first holder 111 and the second holder 112 and has seats 113a where the case 80 is seated. In this configuration, the seats 113a is formed in a shape corresponding to the case 80 to be in close contact with the outer side of the case 80. In this embodiment, the case 80 is formed in a cylindrical shape and the seats 113a have a concaved portion and accordingly can be brought in close contact with the case 80.

The first holder 111, the second holder 112, and the base 113 defines a space where the case 80 and the rod 60 can be seated, so the case 80 is prevented from moving when the device is operated to generate electricity.

Figure 7:
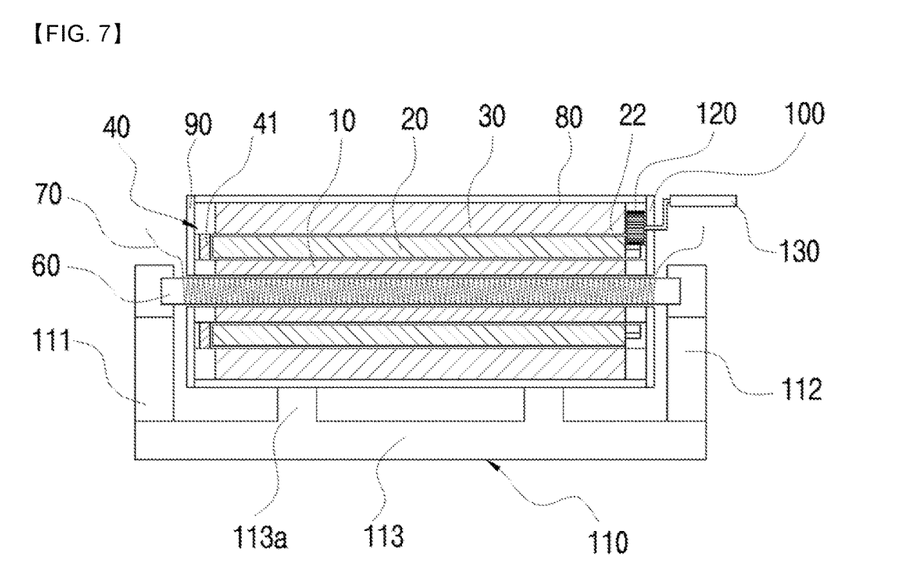
FIG. 7 is a cross-sectional view of an electricity generation device using a neodymium magnet having a helical structure according to another embodiment of the present invention.

FIG. 7 is a cross-sectional view of an electricity generation device using a neodymium magnet having a helical structure according to another embodiment of the present invention.

Referring to FIG. 7, the electricity generation device using a neodymium magnet having a helical structure according to another embodiment of the present invention further includes a first gear 120 and a handle 130 in the configuration of the previous embodiment.

In this embodiment, the same components as those of the previous embodiment are indicated by the same reference numerals and are not repeatedly described, and only the characteristics changed in this embodiment are described hereafter.

In this embodiment, a side gear 22 having teeth is further formed on a first side of the second neodymium magnet 20.

The first gear 120 is in mesh with the side gear 22 to operate together. The side gear 22 of the second neodymium magnet 20 and the first gear 120 are operated in the same principle as bevel gears, so they can rotate with their rotational shafts perpendicular to each other. In this configuration, the first gear 120 may further has a shaft inserted close to the central axis and fixed to the case 80 to rotate.

The handle 130 is coupled to the first gear 120 at the central axis of the first gear 120. The handle 130 may be changed in shape to be more easily rotated by eccentrically coupling the handle 130 and then bending the middle portion two or more times.

The case 80 further has a gear seat where the first gear 120 can be accommodated.

According to the electricity generation device using a neodymium magnet having a helical structure that includes the additional configuration, when the handle 130 is turned, the first gear 120 is rotated, and the second neodymium magnet 20 is rotated by the first gear 120.

Accordingly, the second neodymium magnet 20 generates magnetic field vortexes in the spaces between the first neodymium magnet 10, third neodymium magnet 30, first side magnet 40, and second side magnet 50, so current is generated in the unit coil 70. Obviously, a gear (not shown) that is operated in the principle of a bevel gear may be further provided in the seat of the case 80 to be operated with the first gear 120.

As described above, in the electricity generation device using a neodymium magnet having a helical structure according to an embodiment of the present invention, electricity is generated by turning the handle 130. In this configuration, the second neodymium magnet 20 generates magnetic field vortexes between the first neodymium magnet 10, third neodymium magnet 30, first side magnet 40, and second side magnet 50 by rotating and current is generated in the unit coil 70. Accordingly, it is possible to generate more electricity, manually without power, from the same number of rotations during the same amount of time, as compared with the electricity generation devices of the related art.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description.

Therefore, the sprit of the present invention should not be limited to the above-described embodiments, and the following claims as well as all modified equally or equivalently to the claims are intended to fall within the scope and spirit of the invention.

The invention claimed is:
1. An electricity generation device using a neodymium magnet having a helical structure, comprising:
   a first neodymium magnet (10) formed in the shape of a first cylindrical body, which is open at both ends and has a first mounting hole (11), and composed of partial neodymium magnets arranged around a first outer side of the first cylindrical body helically with respect to a longitudinal direction, in which an inside of the first cylindrical body makes a first pole and the first outer side makes a second pole;
   a second neodymium magnet (20) formed in the shape of a second cylindrical body, which is open at both ends and has a second mounting hole (21), and composed of partial neodymium magnets arranged around a second outer side of the second cylindrical body helically with respect to a longitudinal direction, in which an inside of the second cylindrical body makes a second pole and the second outer side makes a first pole, and the first neodymium magnet (10) is disposed inside the second cylindrical body;
   a third neodymium magnet (30) formed in the shape of a third cylindrical body, which is open at both ends and has a third mounting hole (31), and composed of partial neodymium magnets arranged around a third outer side of the third cylindrical body helically with respect to a longitudinal direction, in which an inside of the third cylindrical body makes a first pole and the third outer side makes a second pole, and the second neodymium magnet (20) is disposed inside the third cylindrical body;
   a first side magnet (40) disposed on a first side of the third neodymium magnet (30), having a first groove (41) in which a first end of the second neodymium magnet (20) is fitted, and having a first support hole (42) having a diameter smaller than the first groove (41) at a center;
   a second side magnet (50) disposed on a second side of the third neodymium magnet (30), having a second groove (41) in which a second end of the second neodymium magnet (20) is fitted, and having a second support hole (52) having a diameter smaller than the second groove (51) at a center;
   a rod (60) inserted in the first mounting hole (11) of the first neodymium magnet (10), with a first end passing through the first support hole (42) and a second end passing through the second support hole (52); and
   a unit coil (70) wound on the rod (60),
   wherein the first neodymium magnet (10) and the third neodymium magnet (30) are fixed and the second neodymium magnet (20) rotates between the first neodymium magnet (10) and the third neodymium magnet (30) to generate an electric field around the unit coil (70) so that electricity is generated in the unit coil (70), and
   the device further comprises:
   a case (80) having a space for accommodating the rod (60), the unit coil (70), the first neodymium magnet (10), the second neodymium magnet (20), the third neodymium magnet (30), the first side magnet (40), and the second side magnet (50), and being formed in the shape of a cylindrical body with both ends open;
   a first cover (90) coupled to a first end of the case (80) to cover the first end of the second neodymium magnet and having a first through-hole (91) through which the first end of the rod (60) and a first end of the unit coil (70) pass;
   a second cover (100) coupled to a second end of the case (80) to cover the second end of the second neodymium magnet and having a second through-hole (101) through which the second end of the rod (60) and a second end of the unit coil (70) pass;
   a cradle (110) having a first holder (111) where the first end of the rod (60) is coupled, a second holder (112) where the second end of the rod (60) is coupled, and a base (113) disposed between the first holder (111) and the second holder (112) and having seats (113*a*) where the case (80) is seated;

a side gear (22) having teeth and formed on a first side of the second neodymium magnet (20);

a first gear (120) being in mesh with the side gear (22) to operate together; and a handle (130) coupled to the first gear (120) at a central axis of the first gear (120) and rotating the second neodymium magnet (20) by rotating the first gear (120), wherein the case (80) further has a seat protruding in a direction to seat the first gear (120).

2. The device of claim 1, wherein, in the second neodymium magnet (20), the first end inserted in the first groove (41) makes a first pole and the second end inserted in the second groove (51) makes a second pole.

3. The device of claim 1, wherein, in the first side magnet (40), the first groove 41 makes a first pole and the second groove (51) makes a second pole to correspond to the polarities of the ends of the second neodymium magnet (20).

4. The device of claim 1, wherein the first pole and the second pole of each of the first neodymium magnet (10), the second neodymium magnet (20), and the third neodymium magnet (30) is any one of an N-pole and an S-pole.

5. The device of claim 1, wherein the first neodymium magnet (10), the second neodymium magnet (20), and the third neodymium magnet (30) are combined without outer sides and inner sides in contact with each other.

6. The device of claim 1, wherein the first neodymium magnet (10) and the third neodymium magnet (30) arranged helically at an angle are inclined in the same direction.

7. The device of claim 1, wherein the first neodymium magnet (10) and the third neodymium magnet (30) arranged helically at an angle are inclined in opposite direction to the second neodymium magnet (20).

\* \* \* \* \*